(12) United States Patent
Blackwood (10) Patent No.: US 8,489,327 B2
(45) Date of Patent: Jul. 16, 2013

(54) NAVIGATION DEVICE AND METHOD FOR PROVIDING ALTERNATIVE NETWORK CONNECTIONS

(75) Inventor: Adrian Kyle Blackwood, The Hague (NL)

(73) Assignee: TomTom International B.V., Amsterdam (NL)

( * ) Notice: Subject to any disclaimer, the term of this patent is extended or adjusted under 35 U.S.C. 154(b) by 904 days.

(21) Appl. No.: 12/007,383

(22) Filed: Jan. 9, 2008

(65) Prior Publication Data

US 2008/0177461 A1  Jul. 24, 2008

Related U.S. Application Data

(60) Provisional application No. 60/879,543, filed on Jan. 10, 2007, provisional application No. 60/879,593, filed on Jan. 10, 2007, provisional application No. 60/879,598, filed on Jan. 10, 2007, provisional application No. 60/879,541, filed on Jan. 10, 2007.

(51) Int. Cl.
| | |
|---|---|
| G01C 21/00 | (2006.01) |
| G01C 21/34 | (2006.01) |
| G06F 19/00 | (2011.01) |
| G08G 1/123 | (2006.01) |

(52) U.S. Cl.
USPC ........... 701/450; 701/484; 701/522; 701/537; 340/995.12

(58) Field of Classification Search
USPC ................ 701/200, 201, 208, 209, 210, 213, 701/400, 408, 409, 410, 411, 412, 417, 418, 701/420, 421, 423, 424, 430, 431, 433, 450, 701/451, 452, 461, 468, 483, 484, 516, 521, 701/522, 532, 533, 537; 340/995.12, 995.13, 340/425.5, 989, 995.1, 426.22; 342/357.2, 342/357.52; 455/403, 404.2, 414.2, 421, 455/422.1, 426.1, 426.2, 432.1
See application file for complete search history.

(56) References Cited

U.S. PATENT DOCUMENTS 6,138,072 A * 10/2000 Nagai ........................... 701/207
6,201,498 B1 * 3/2001 Fan .......................... 342/357.31

(Continued)

FOREIGN PATENT DOCUMENTS

| EP | 1209930 A2 | 5/2002 |
|---|---|---|
| EP | 1297982 A1 | 4/2003 |
| JP | 10089980 A | 4/1998 |
| JP | 2005315626 A | 11/2005 |

(Continued)

OTHER PUBLICATIONS

International Search Report issued on Apr. 16, 2008 for International Application No. PCT/EP2008/000188.

(Continued)

Primary Examiner — Thomas Tarcza
Assistant Examiner — Edward Pipala (57) ABSTRACT

A method and device are disclosed for navigation. In at least one embodiment, the method includes connecting a navigation device to a server via a modem connection; receiving information from the server; determining whether or not criteria will be met for disconnecting the modem connection; and connecting the navigation device to the server via an alternative connection upon determining that criteria will be met for disconnecting the modem connection. In at least one embodiment, the navigation device includes a modem to connect the navigation device to a server a receiver to receive information from the server; a processor to determine whether or not criteria will be met for disconnecting the connection via the modem; and an alternative connection device (such as the Bluetooth device for paired mobile phone connection, for example) to connect the navigation device to the server, the alternative connection device being used upon the processor determining that criteria will be met for disconnecting the connection of the modem.

20 Claims, 7 Drawing Sheets

U.S. PATENT DOCUMENTS

| | | | |
|---|---|---|---|
| 6,202,023 B1 * | 3/2001 | Hancock et al. | 701/201 |
| 6,246,688 B1 * | 6/2001 | Angwin et al. | 370/401 |
| 6,816,761 B2 | 11/2004 | Denton | |
| 7,484,008 B1 * | 1/2009 | Gelvin et al. | 709/249 |
| 2003/0014187 A1 * | 1/2003 | Chun et al. | 701/209 |
| 2004/0165563 A1 | 8/2004 | Hsu et al. | |
| 2006/0211446 A1 * | 9/2006 | Wittmann et al. | 455/552.1 |
| 2011/0029644 A1 * | 2/2011 | Gelvin et al. | 709/220 |

FOREIGN PATENT DOCUMENTS

| | | |
|---|---|---|
| WO | 0077620 | 12/2000 |

OTHER PUBLICATIONS

International Preliminary Report on Patentability and Written Opinion of the International Search Authority issued on Jul. 14 2009 for International Application No. PCT/EP2008/000188.

* cited by examiner

NAVIGATION DEVICE AND METHOD FOR PROVIDING ALTERNATIVE NETWORK CONNECTIONS

CO-PENDING APPLICATIONS

The following applications are being filed concurrently with the present applications. The entire contents of each of the following applications is hereby incorporated herein by reference:
A NAVIGATION DEVICE AND METHOD FOR ENHANCING TRAFFIC DATA application Ser. No. 12/007,381 filed on even date herewith; A NAVIGATION DEVICE AND METHOD FOR IMPROVING A TIME TO IDENTIFY A LOCATION OF THE NAVIGATION DEVICE application Ser. No. 12/007,382 filed on even date herewith; and A NAVIGATION DEVICE AND METHOD FOR DETERMINING NETWORK COVERAGE application Ser. No. 12/007,373 filed on even date herewith.

PRIORITY STATEMENT

The present application hereby claims priority under 35 U.S.C. §119(e) on each of U.S. Provisional Patent Application Nos. 60/879,543 filed Jan. 10, 2007, 60/879,593 filed Jan. 10, 2007, 60/879,598 filed Jan. 10, 2007, and 60/879,541 filed Jan. 10, 2007, the entire contents of each of which is hereby incorporated herein by reference.

FIELD

The present application generally relates to navigation methods and devices.

BACKGROUND

Navigation devices were traditionally utilized, in vehicles or even on foot, for navigating between two points. Such devices, when used in vehicles, often initially tried to plan a fasted route based upon, for example, a route including mostly highway usage. Such a route was planned to maximize vehicle speed during travel along the route.

During such travel, however, a vehicle would often encounter traffic delays, which would slow travel along even a route including mostly highways. Accordingly, navigation devices became more sophisticated and were able to receive information and to utilize the information to plan navigation routes around the traffic delays. Other services also became available to the navigation devices, such as providing locations of traffic cameras, providing additional updates other than traffic delay information, etc. Such traffic and other information could be provided, via a Bluetooth or other data connection, via a mobile phone paired with the navigation device. However, by using only mobile phone connections, users of the navigation devices were subject to roaming and other charges of the mobile networks.

SUMMARY

The inventors discovered that if a modem connection is used from within the navigation device, more accurate data regarding vehicle speed, vehicle slow downs and other data for calculating traffic conditions can be received and as such, more accurate information can be provided to the navigation device regarding current traffic conditions. Further, regarding traffic and other services, the inventors discovered that if the navigation devices can predominantly rely on an internal modem and a pre-negotiated SIM card (for example, with a price negotiated by the navigation device provider/manufacturer and the phone service provider, then additional roaming and other charges previously potentially obtained via mobile phone providers when using mobile phones paired with navigation devices, could be avoided. Finally, the inventors also discovered that it may be preferable to maintain a modem connection when possible, that it may be beneficial, at times when the modem connection will be lost due to a network area change for example, to provide the navigation with the ability to switch to an alternative connection, such as a paired mobile phone connection.

In at least one embodiment of the present application, a method includes connecting a navigation device to a server via a modem connection; receiving information from the server; determining whether or not criteria will be met for disconnecting the modem connection; and connecting the navigation device to the server via an alternative connection upon determining that criteria will be met for disconnecting the modem connection.

In at least one embodiment of the present application, a navigation device includes a modem to connect the navigation device to a server; a receiver to receive information from the server; a processor to determine whether or not criteria will be met for disconnecting the connection via the modem; and an alternative connection device (such as the Bluetooth device for paired mobile phone connection, for example) to connect the navigation device to the server, the alternative connection device being used upon the processor determining that criteria will be met for disconnecting the connection of the modem.

In at least one embodiment of the present application, a navigation device includes means for connecting a navigation device to a server via a modem connection; means for receiving information from the server; means for determining whether or not criteria will be met for disconnecting the modem connection; and means for connecting the navigation device to the server via an alternative connection upon determining that criteria will be met for disconnecting the modem connection.

BRIEF DESCRIPTION OF THE DRAWINGS

The present application will be described in more detail below by using example embodiments, which will be explained with the aid of the drawings, in which.

DETAILED DESCRIPTION OF THE EXAMPLE EMBODIMENTS

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described. Like numbers refer to like elements throughout. As used herein, the term "and/or" includes any and all combinations of one or more of the associated listed items.

Figure 1:
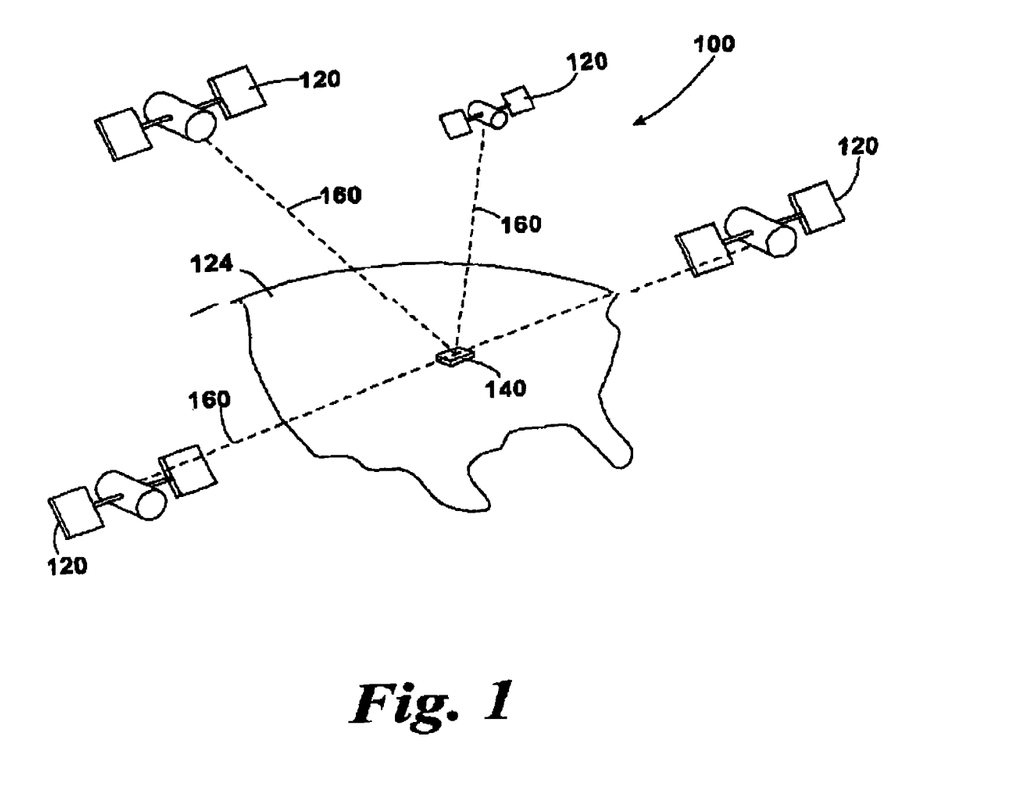
FIG. 1 illustrates an example view of a Global Positioning System (GPS)

FIG. 1 illustrates an example view of Global Positioning System (GPS), usable by navigation devices, including the navigation device of embodiments of the present application. Such systems are known and are used for a variety of purposes. In general, GPS is a satellite-radio based navigation system capable of determining continuous position, velocity, time, and in some instances direction information for an unlimited number of users.

Formerly known as NAVSTAR, the GPS incorporates a plurality of satellites which work with the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140, usable in embodiments of navigation devices of the present application, is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
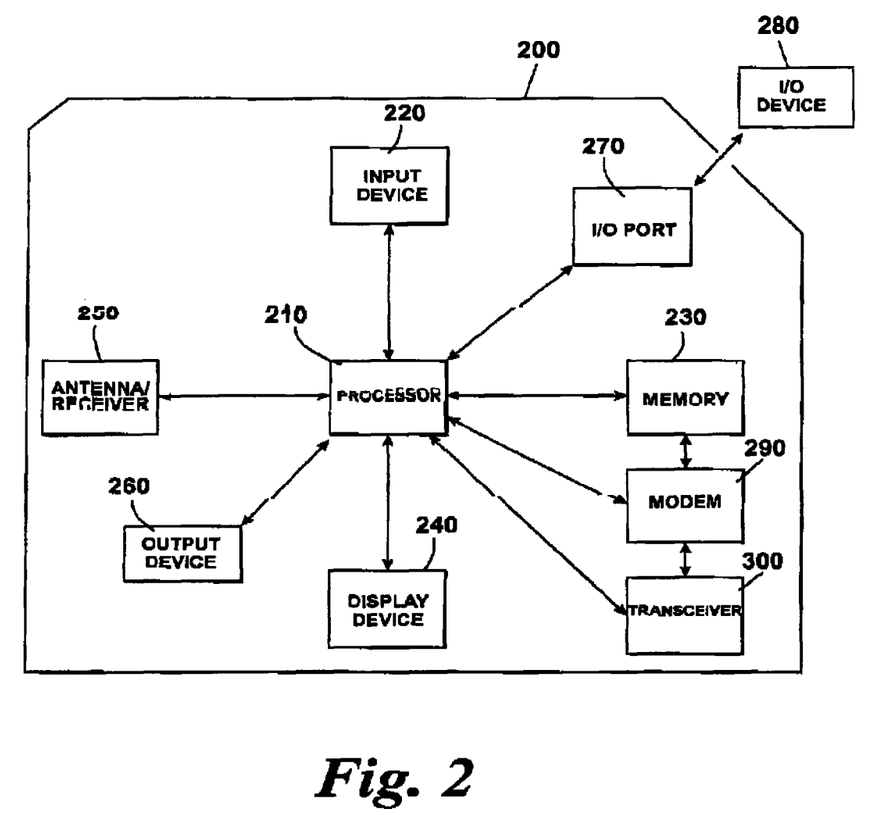
FIG. 2 illustrates an example block diagram of electronic components of a navigation device of an embodiment of the present application.

FIG. 2 illustrates an example block diagram of electronic components of a navigation device 200 of an embodiment of the present application, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilized to input information; and the display device 240 can include any type of display screen such as an LCD display, for example. In at least one embodiment of the present application, the input device 220 and display device 240 are integrated into an integrated input and display device, including a touchpad or touchscreen input wherein a user need only touch a portion of the display device 240 to select one of a plurality of display choices or to activate one of a plurality of virtual buttons.

In addition, other types of output devices 260 can also include, including but not limited to, an audible output device. As output device 260 can produce audible information to a user of the navigation device 200, it is equally understood that input device 240 can also include a microphone and software for receiving input voice commands as well.

In the navigation device 200, processor 210 is operatively connected to and set to receive input information from input device 240 via a connection, and operatively connected to at least one of display device 240 and output device 260, via connections to output information thereto. Further, the processor 210 is operatively connected to memory 230 via a connection and is further adapted to receive/send information from/to input/output (I/O) ports 270 via a connection, wherein the I/O port 270 is connectible to an I/O device 280 external to the navigation device 200. The external I/O device 270 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

In at least one embodiment, the navigation device 200 includes an internal modem 290, connected to processor 210 and memory 230, for establishing data connections as will be described hereafter. The modem 290 may further be connected to transceiver 300 for transmitting information to and receiving information from server 302. The transceiver 300 is further connected to processor 210.

The navigation device 200, in at least one embodiment, may establish a "mobile" network connection with the server 302 via an external mobile device not shown (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection may be established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using the internet for example, can be done in a known manner. This can include use of TCP/IP layered protocol for example. The mobile device can utilize any number of communication standards such as CDMA, GSM, WAN, etc.

As such, an internet connection may be utilized which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet.

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

For GRPS phone settings, the Bluetooth enabled device may be used to correctly work with the ever changing spectrum of mobile phone models, manufacturers, etc., model/manufacturer specific settings may be stored on the navigation device 200 for example. The data stored for this information can be updated in a manner discussed in any of the embodiments, previous and subsequent.

The navigation device 200 may include its own mobile phone technology within the navigation device 200 itself (including an antenna for example, wherein the internal antenna of the navigation device 200 can further alternatively be used). The mobile phone technology within the navigation device 200 can include internal components as specified above, and/or can include an insertable SIM (subscriber identity module) card, complete with necessary mobile phone technology and/or an antenna for example. As such, mobile phone technology within the navigation device 200, in conjunction with modem 290, can similarly establish a network connection between the navigation device 200 and the server 302, via the internet for example, in a manner similar to that of any mobile device. It should be noted that such a modem 290 can be internal to the navigation device 200, or external in an adapter for example, see U.S. application Ser. No. 11/907, 254 entitled "Enhanced Cigarette Lighter Adapter" and filed Oct. 10, 2007, the entire contents of which are hereby incorporated herein by reference. If located in the adapter, upon the adapter being plugged in to a vehicle for example, power can be supplied to the navigation device 200. In addition, the modem 290 can then be triggered to establish a network connection with the server 200 to send information thereto and receive information therefrom.

FIG. 2 further illustrated an operative connection between the processor 210 and an antenna/receiver 250, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered within the scope of the present application. For example, in one embodiment, the components shown in FIG. 2 may be in communication with one another via wired and/or wireless connections and the like. Thus, the scope of the navigation device 200 of the present application includes a portable or handheld navigation device 200.

Figure 3:
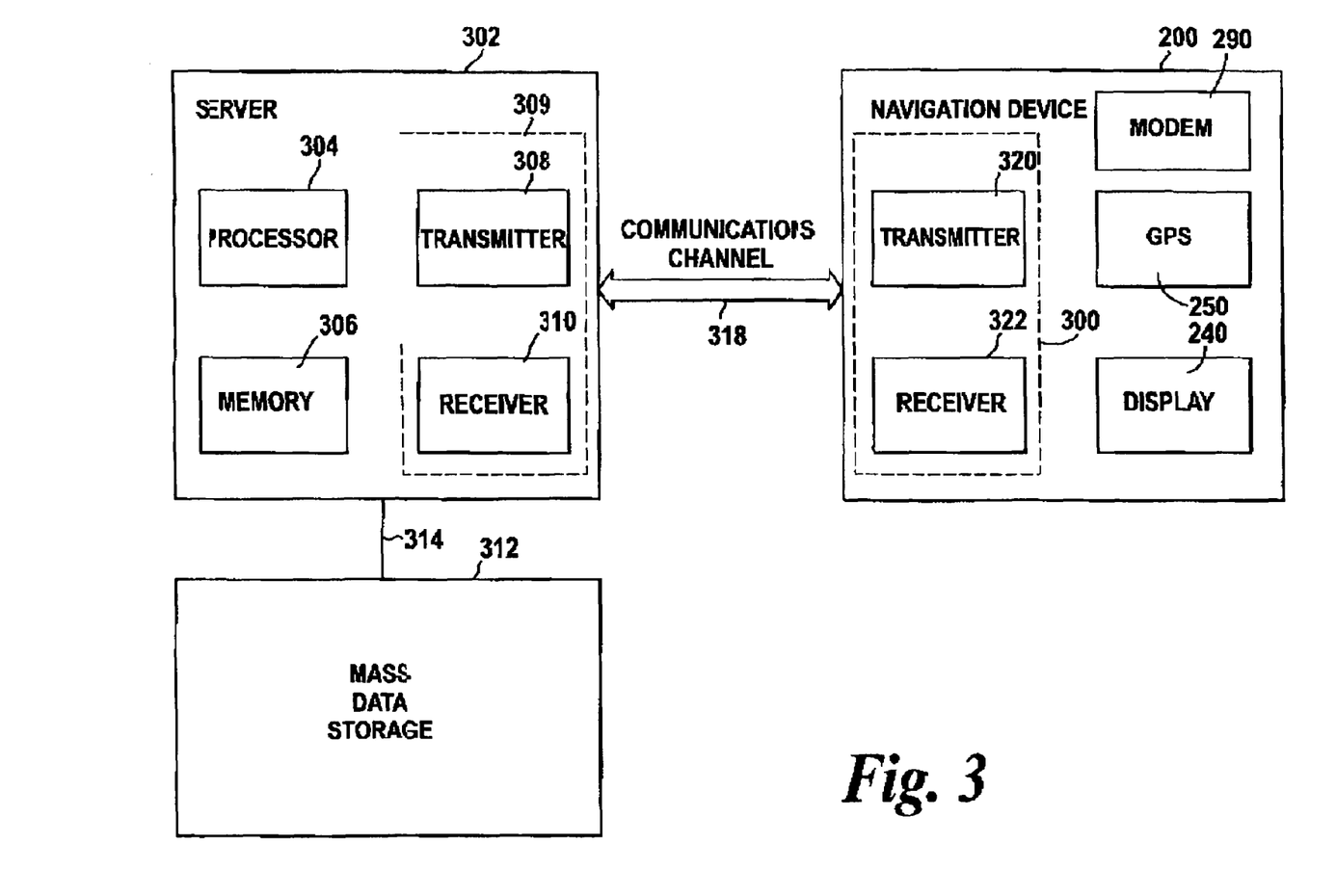
FIG. 3 illustrates an example block diagram of a server, navigation device and connection therebetween of an embodiment of the present application.

FIG. 3 illustrates an example block diagram of a server 302 and a navigation device 200 of the present application, via a generic communications channel 318, of an embodiment of the present application. The server 302 and a navigation device 200 of the present application can communicate when a connection via communications channel 318 is established between the server 302 and the navigation device 200 (noting that such a connection can be a data connection via mobile device, a direct connection via personal computer via the internet, a data connection via modem 290, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. Information received by server 302 can include but is not limited to received information relating to changes in position and speed of a vehicle housing a navigation device 200; and information sent by the server 302 can include but is not limited to calculated traffic information and/or other information relating to potential delays along a route of travel of a vehicle in which a navigation device 200 is located. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver 309.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through any communications channel generally designated by 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver 300.

Software stored in server memory 306 provides instructions for the processor 304 and allows the server 302 to provide services to the navigation device 200, such as calculation and transmission of traffic information and/or other information relating to potential delays along a route of travel of a vehicle in which a navigation device 200 is located. One service provided by the server 302 involves processing requests from the navigation device 200 and transmitting navigation data from the mass data storage 312 to the navigation device 200. According to at least one embodiment of the present application, another service provided by the server 302 includes processing the navigation data using various algorithms for a desired application (such as calculation of traffic information and/or other information relating to potential delays along a route of travel of a vehicle in which a navigation device 200 is located for example) and sending the results of these calculations to the navigation device 200.

The communication channel 318 generically represents the propagating medium or path that connects the navigation device 200 and the server 302. According to at least one embodiment of the present application, both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, according to at least one embodiment, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fiber optic cables, converters, radio-frequency (rf) waves, the atmosphere, empty space, etc. Furthermore, according to at least one various embodiment, the communication channel 318 can include intermediate devices such as routers, repeaters, buffers, transmitters, and receivers, for example.

In at least one embodiment of the present application, for example, the communication channel 318 includes telephone and computer networks. Furthermore, in at least one embodiment, the communication channel 318 may be capable of accommodating wireless communication such as radio frequency, microwave frequency, infrared communication, etc. Additionally, according to at least one embodiment, the communication channel 318 can accommodate satellite communication. Additionally, according to at least one embodiment, the communication channel 318 can accommodate multiple, independent satellite systems, and GPS receivers capable of multiple frequencies and signal acquisitions. (Covers impending addition of Multiple Satellite Systems, including, but no limited to; GLONASS, GPS 2, GPS 2.5-3, Galileo and ChinaSat).

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. According to at least one embodiment, these signals may be modulated, encrypted and/or compressed signals as may be desirable for the communication technology.

The mass data storage 312 includes sufficient memory for the desired navigation applications. Examples of the mass data storage 312 may include magnetic data storage media such as hard drives for example, optical storage media such as CD-Roms for example, charged data storage media such as flash memory for example, molecular memory, etc.

According to at least one embodiment of the present application, the server 302 includes a remote server accessible by the navigation device 200 via a wireless channel. According to at least one other embodiment of the application, the server 302 may include a network server located on a local area network (LAN), wide area network (WAN), virtual private network (VPN), etc.

According to at least one embodiment of the present application, the server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device (and/or a modem such as modem 290) may establish a wireless connection to the internet, for connecting the navigation device 200 to the server 302 via the internet.

The navigation device 200 may be provided with information from the server 302 via information downloads which may be periodically updated upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

The mass storage device 312 connected to the server 302 can include volumes more cartographic and route data than that which is able to be maintained on the navigation device 200 itself, including maps, etc. The server 302 may process, for example, the majority of the devices of a navigation device 200 which travel along the route using a set of processing algorithms. Further, the cartographic and route data stored in memory 312 can operate on signals (e.g. GPS signals), originally received by the navigation device 200.

As indicated above in FIG. 2 of the application, a navigation device 200 of an embodiment of the present application includes a processor 210, an input device 220, and a display screen 240. In at least one embodiment, the input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 240, such as audio input/output devices for example.

Figure 4A:
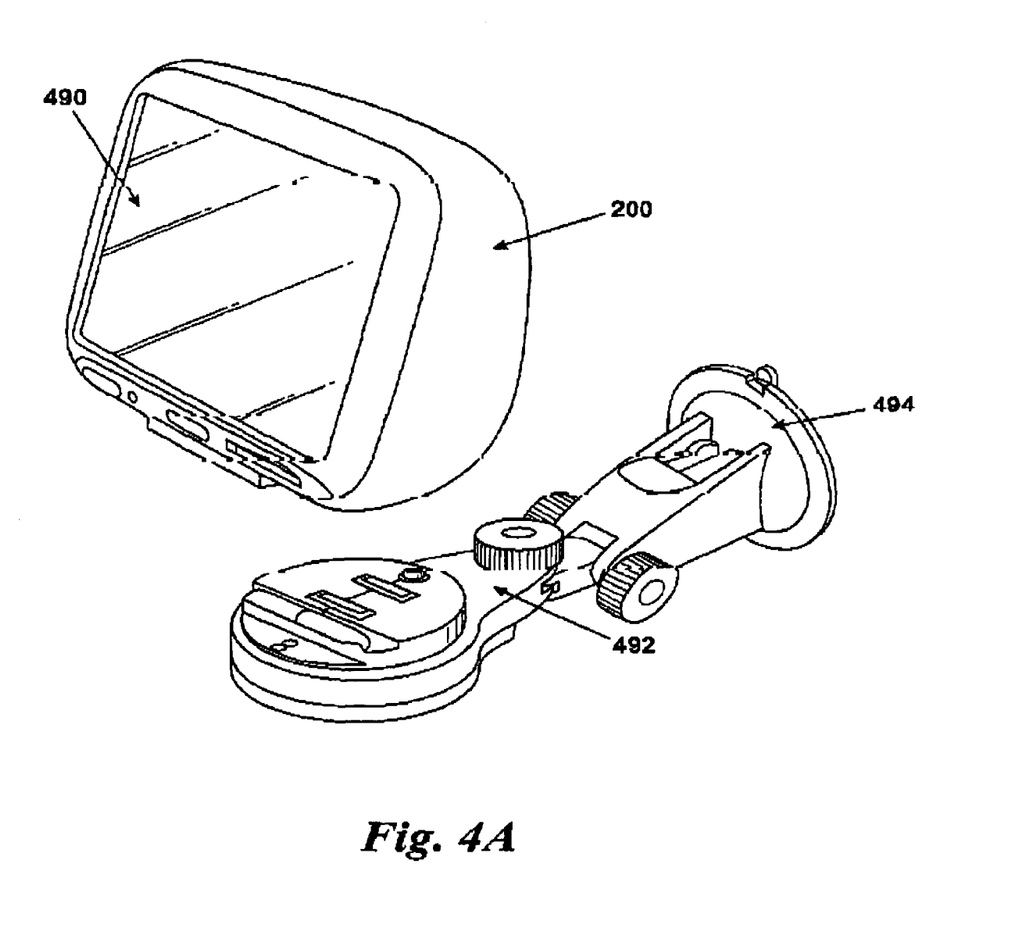
FIGS. 4A and 4B are perspective views of an actual implementation of an embodiment of the navigation device 200.
Figure 4B:
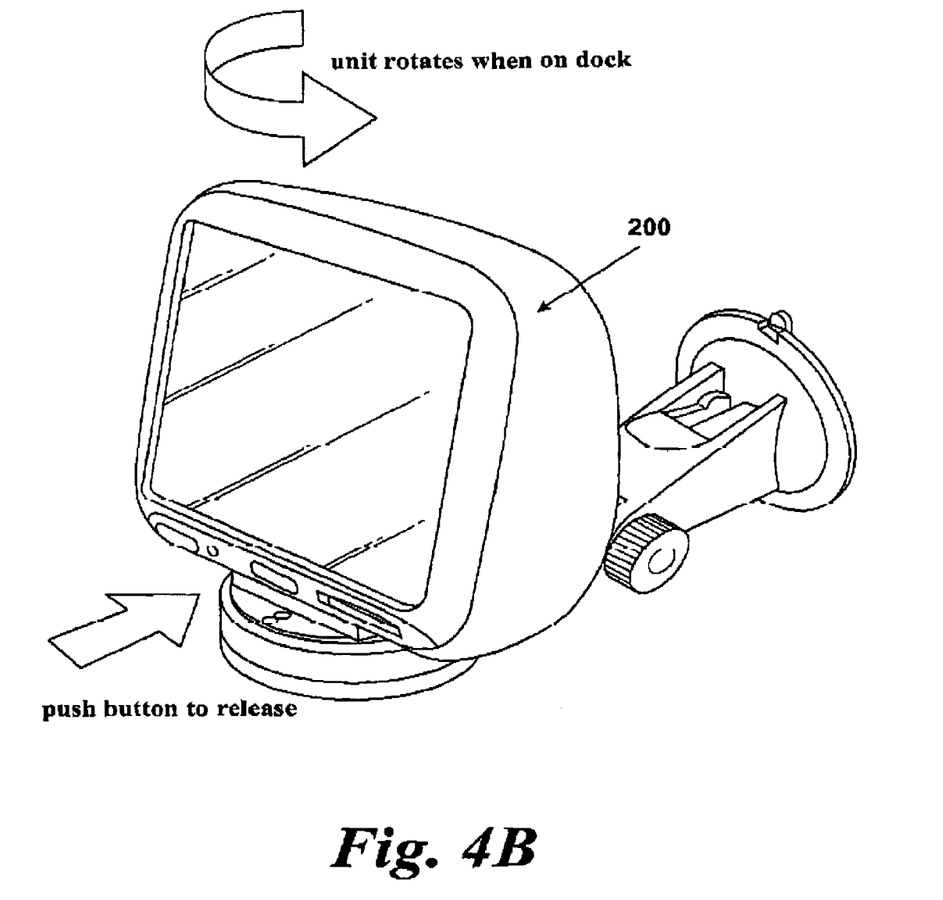

FIGS. 4A and 4B are perspective views of an actual implementation of an embodiment of the navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 220, etc.).

The navigation device 200 may sit on an arm 292, which itself may be secured to a vehicle dashboard/window/etc. using a large suction cup 294. This arm 292 is one non-limiting example of a docking station to which the navigation device 200 can be docked.

As shown in FIG. 4B, the navigation device 200 can be docked or otherwise connected to an arm 292 of the docking station by snap connecting the navigation device 292 to the arm 292 for example (this is only one example, as other known alternatives for connection to a docking station are within the scope of the present application). The navigation device 200 may then be rotatable on the arm 292, as shown by the arrow of FIG. 4B. To release the connection between the navigation device 200 and the docking station, a button on the navigation device 200 may be pressed, for example (this is only one example, as other known alternatives for disconnection to a docking station are within the scope of the present application).

The navigation device 200, in at least one embodiment, may establish a "mobile" network connection with the server 302 via a mobile device 400 (such as a mobile phone, PDA, and/or any device with mobile phone technology) establishing a digital connection (such as a digital connection via known Bluetooth technology for example). Thereafter, through its network service provider, the mobile device 400 can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device 400 (via a service provider) and another device such as the server 302, using the internet 410 for example, can be done in a known manner. This can include use of TCP/IP layered protocol for example. The mobile device 400 can utilize any number of communication standards such as CDMA, GSM, WAN, etc.

As such, an internet connection may be utilized which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device 400, and eventually with the internet 410 and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, wherein the internal antenna of the navigation device 200 can further alternatively be used). The mobile phone technology within the navigation device 200 can include internal components as specified above, and/or can include an insertable SIM card and modem 290, complete with necessary mobile phone technology and/or an antenna for example. As such, mobile phone technology within the navigation device 200 can similarly establish a network connection between the navigation device 200 and the server 302, via the internet 410 for example, in a manner similar to that of any mobile device 400.

For GRPS phone settings, the Bluetooth enabled device may be used to correctly work with the ever changing spectrum of mobile phone models, manufacturers, etc., model/manufacturer specific settings may be stored on the navigation device 200 for example. The data stored for this information can be updated in a manner discussed in any of the embodiments, previous and subsequent.

In an embodiment of the present application, a method includes connecting a navigation device 200 to a server 302 via a modem connection; receiving information from the server 302; determining whether or not criteria will be met for disconnecting the modem connection; and connecting the navigation device 200 to the server 302 via an alternative connection upon determining that criteria will be met for disconnecting the modem connection.

In an embodiment of the present application, a navigation device 200 includes a modem 290 to connect the navigation device 200 to a server 302; a receiver 322 to receive information from the server 302; a processor 210 to determine whether or not criteria will be met for disconnecting the connection via the modem 290; and an alternative connection device (such as the Bluetooth device for paired mobile device connection, for example) to connect the navigation device 200 to the server 302, the alternative connection device being used upon the processor 210 determining that criteria will be met for disconnecting the connection of the modem 290.

In an embodiment of the present application, mobile phone technology of the navigation device 200 itself can include a modem 290, either located internal to the navigation device 200 or external thereto, such as in an adapter for example. Further, a SIM card (enabled for GPRS data traffic for example) can be included in the navigation device 200 to allow the modem 290 to connect to the server 302. When modem 290 is located internal to navigation device 200, Network Data Traffic between navigation device 200 and server 302 is recorded by the enabling Mobile Network Operator (MNO).

In at least one embodiment, the navigation device company (TomTom for example) may act as a Virtual Mobile Network Operator (VMNO), and the individual user may pay the navigation device company for services based on unlimited service within there package (subscription for example). For example, if a user subscribes to a National package, data traffic may be of unlimited use (to a pre-defined maximum) for data services between navigation device 200 using modem 290 and a SIM card registered to their account, for example. As such, a connection between the navigation device 200 and the server 302 can be established anytime after powering on of the navigation device 200.

When modem 290 is located external to navigation device 200, Network Data Traffic between navigation device 200 and server 302 may be recorded by the client's or user's Mobile Network operator, and uses a SIM card for example, and an account, not controlled by the navigation device company. In such an embodiment, there is no billing or usage agreement arrangement between the navigation device company and the Mobile Network Operator (MNO).

In an embodiment of the present application, once the navigation device 200 is purchased and turned on, a data (e.g. internet) connection between the modem 290 and server 302 may be established to permit receipt of service information such as, for example, information relating to potential delays along a route of travel of a vehicle housing the navigation device 200 (such as traffic information for example) from the server 302. However, as the data connection is established with the server 302 in such an automatic manner, the server 302 can thus receive information relating to changes in speed and position (determined in a known manner) from a plurality of navigation devices 200 and can thus perform calculations regarding potential delays along travel routes using more accurate data, although the calculations themselves are generally performed in a known manner. The information received by the navigation device can include, but is not limited to LTO information, traffic information, traffic camera information, updated or new map information, etc.

The receipt of any information by the navigation device 200 can only occur as long as the connection is maintained. Although connection via modem 290, in conjunction with a SIM card and transceiver 300, may be better than a Bluetooth connection to an external modem, in an external mobile device paired to the navigation device 200 for example, in that potential unpredictable charges, such as "roaming" charges on a mobile network for example, can be avoided, such a wireless connection, like any other wireless connection, is subject to areas of drops or weak signal strength areas, or areas of network change, which will cause the modem connection to be lost and/or deteriorated to the point where data information transfer with the server 302 will fail. The inventors discovered that to the extent that such areas can be detected or predicted in advance, at least one embodiment of the present application provides a method for determining whether or not criteria will be met for disconnecting the modem connection and for connecting the navigation device 200 to the server 302 via an alternative connection.

By using a modem 290 within the navigation device 200, and/or external thereto in an adaptor of the navigation device 200 for example, information can be received by the navigation device 200, transmitted from the server 302 (throughout the application, the "internal" or navigation device modem 290 may be one within the navigation device 200 and/or within an adapter of the navigation device 200, such as an "in car" power adapter for example (for example, see U.S. application Ser. No. 11/907,254, the entire contents of which are incorporated herein by reference). In an embodiment, the navigation device 200 may attempt to establish a GPRS connection, for example, using the modem 290 as soon as the navigation device 200 is switched on and/or connected to a power supply through an adaptor. Network connection to the server 302 can be provided via the SIM card, inserted into the navigation device 200 to establish network addresses for network connection of the modem 290 for example.

Figure 5:
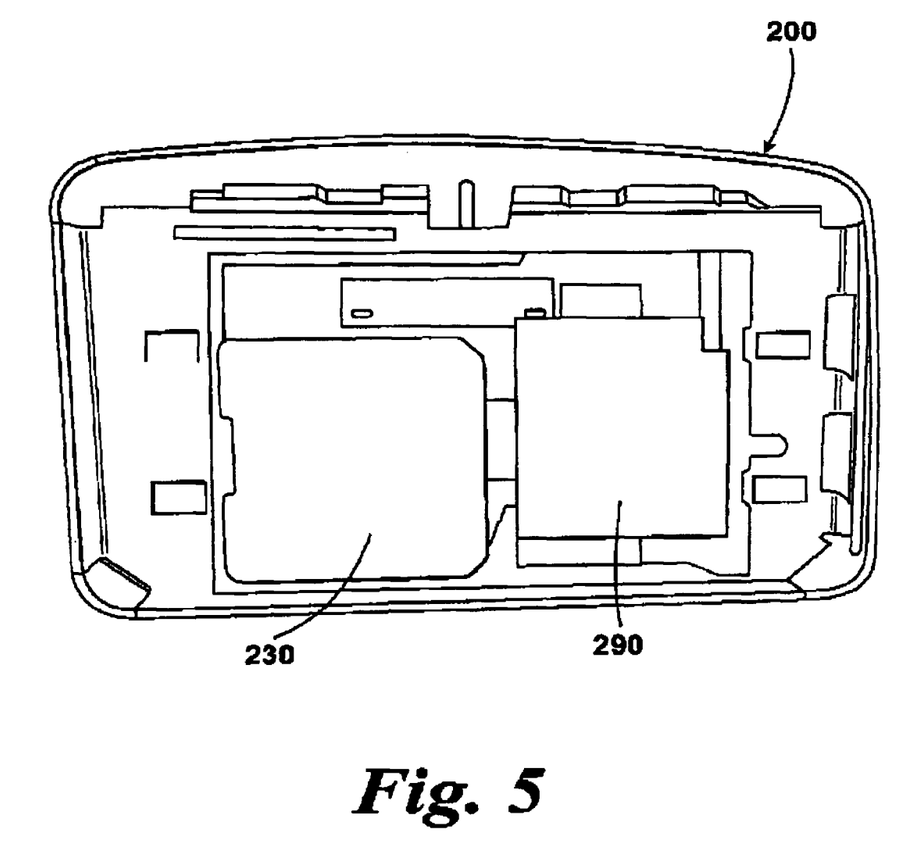
FIG. 5 is an example embodiment illustrating the modem and SIM card of the navigation device.

Such a SIM card and modem 290 are shown in FIG. 5, within the navigation device 200. The SIM card can be provided to the user in exchange for a flat fee paid to the maker of the navigation device 200 for subscribing to a traffic service for example (for example, a navigation device manufacturer TomTom may have an arrangement with a network service provider such as Vodophone for example, to permit TomTom to offer owners of navigation devices a fixed price connection service via the modem 290 connection). By default, if the modem 290 is internal to the navigation device 200, the modem 290 may always be enabled upon powering the device on to establish a network connection with the server 302 and/or if included in an adaptor of the navigation device, may be enabled to establish such a connection upon the adaptor being connected to the vehicle.

Network connection to the server 302 can be provided via the SIM card, inserted into the navigation device 200 to establish network addresses for network connection of the modem 290 for example. In an embodiment of the present application, mobile phone technology of the navigation device 200 itself can include a modem 290, either located internal to the navigation device 200 or external thereto, such as in an adapter for example. Further, a SIM card (enabled for GPRS data traffic for example) can be included in the navigation device 200 to allow the modem 290 to connect to the server 302.

In an embodiment, the navigation device 200 further includes an additional modem to connect the navigation device 200 to a server 302 upon the processor 210 determining via the SIM card contained internal to the navigation device 200, available through a paired mobile device via a Bluetooth connection for example. Both modems may be terrestrial Networked data transfer specific technology, such as GSM or CDMA, the predominant Terrestrial data technologies. The internal modem 290 may be, for example, a GSM/GPRS based Modem, allowing access to specific bands of Terrestrial Data Transfer Networks. The navigation device manufacturer may provide a determination for signal frequencies based on geographic location and other commercial, and non-commercial criteria. Further, the internal modem 290 may be, for example, a CDMA/1X based Modem, allowing access to specific bands of Terrestrial Data Transfer Networks. The navigation device manufacturer may provide a determination for signal frequencies based on geographic location and other commercial, and non-commercial criteria.

With access to multiple modem connections, both internal and external to the navigation device 200, the navigation device 200 can allow multiple access to a greater choice of specific bands of Terrestrial Data Transfer Networks. The navigation device Manufacturer may provide an internal default modem 290, and may permit access to external determination for signal frequencies based on geographic location and other commercial and/or non-commercial criteria, as well as priority sequencing for internal to external modem usage. Further, the processor 210 may be used to determine, via the SIM card contained internal to the navigation device 200 for example, a list containing detailed, Manufacturer provided, priority sequencing for internal to external modem usage. This list may contain default reference rules governing the internal to external modem switching.

When a modem 290 is located internal to navigation device 200, Network Data Traffic between navigation device 200 and server 302 is recorded by the enabling Mobile Network Operator (MNO). For Internal use, the Navigation Device 200 user may use a specific SIM card provided by the device manufacture for example. This SIM card may use ANTI-THEFT technology to ensure that users can only use SIM cards provided by the Manufacture in the navigation device 200, and that users cannot use the Provided SIM Card in other, GPRS enabled devices. In both scenarios, only a combination of Manufacture provide the navigation device 200, and Manufacture provided SIM cards can be combined to form a Communication Channel connection via modem 290, though a pre-defined IP channel, to server 290.

In this embodiment, the navigation device manufacturer (TomTom for example) may act as a Virtual Mobile Network Operator (VMNO), and the individual users may receive a branded TomTom SIM card containing additional code, and an ANTI-THEFT First Time Use Start-up sequence. Further, This SIM card may contain a list of allowed Mobile Network Operators (MNO's), and their priority sequences. This sequence may determine the preferred network usage, and the default network selection.

Also included in this SIM card, may be the potential for a separate list containing detailed, Manufacturer provided, priority sequencing for internal to external modem usage. This list could then be a default reference list governing rules associated with internal to external modem switching.

Thus, in at least one embodiment, the navigation device 200 includes a modem 290 to connect the navigation device 200 to a server 302, via the SIM card contained internal to the navigation device 200, and via a terrestrial Networked data transfer specific technology. In at least one embodiment, the internal modem 290 is a GSM/GPRS based Modem, allowing access to specific bands of Terrestrial Data Transfer Networks. In at least one other embodiment, the internal modem 290 is a CDMA/1X based Modem, allowing access to specific bands of Terrestrial Data Transfer Networks. In either embodiment, the navigation device Manufacturer may provide determination for signal frequencies based on geographic location and other commercial and/or non-commercial criteria.

When modem 290 is located external to navigation device 200 (such as in a separate mobile device paired with the navigation device 200 via a Bluetooth connection for example), Network Data Traffic between navigation device 200 and server 302 may be a function of the user's or client's Mobile Network Operator (MNO), and may use a SIM card for an account not controlled by the navigation device manufacturer. In this embodiment, there may be a pre-determination of network, or modem, a type of prioritization between the navigation device manufacturer and the Mobile Network Operator (MNO).

Regarding the internal to external modem switching, the processor 210 may determine, via the SIM card contained internal to the navigation device 200, a list containing detailed, Manufacturer provided for example, priority sequencing for internal to external modem 290 usage. This list may contain default reference rules governing the internal to external modem switching.

In at least one embodiment, upon an internal calculation of the processor 210 determining that a network change is about to occur, for example that network coverage is/or is about to fall below a pre-set signal level and/or that an imminent end to internal network service is about to occur, a switch may be performed between the internal, default, network connection, and an external, secondary, network connection (such as via a mobile phone/Bluetooth connection for example). Data transfer information between the navigation device 200 and a server 302, via the internal modem 290 may be severed through a shut down sequence for example, and a new connection may be initiated via a modem connected to an adaptor of the navigation device for example, and/or data communication via wither wireless protocols, such as Bluetooth, or though a direct connection, such as via a modem in a secondary Adaptor for example. In such an embodiment, the modem 290 can operate in cooperation with a transceiver 300 to transfer information between the navigation device 200 and a server 302 upon the processor 210 determining that network area coverage of the external modem (such as via a mobile phone/Bluetooth connection for example), will permit data information transfer.

In such an embodiment, information transmitted between the navigation device 200 and the server 302 in the initial start-up sequence may default to the internal modem 290, and thus, the internal modem Network type and coverage. When the internal modem 290 does not provide coverage, or when upcoming network change is about to occur upon a planned route, the navigation device 200 will then switch the default modem to the external modem.

The SIM card can be provided to the user in exchange for a flat fee paid to the maker of the navigation device 200 for subscribing to a traffic service for example (for example, a navigation device manufacturer TomTom may have an arrangement with a network service provider such as Vodophone for example, to permit TomTom to offer owners of navigation devices a fixed price connection service via the modem 290 connection). In this arrangement, Manufacturers such as TomTom may take advantage of Scales-of-Economy, simply having larger purchase power than an individual, and can affect Cost Optimization Network System Constraints. As technical Attributes of navigation device to server activity; the manufacture can reduce internal data usage, and the associated costs for such activities.

For example, Block Size rounding, Group Data Pooling, and Sessions Terms and Conditions, can all be coded into the rules governing internal modem usages. By default, if the modem 290 is internal to the navigation device 200, the modem 290 may always be enabled upon powering the device on to establish a network connection with the server 302 and/or if included in an adaptor of the navigation device 200, may be enabled to establish such a connection upon the adaptor being connected to the vehicle.

In an embodiment of the present application, the traffic and/or information relating to potential delays along the route of travel of the vehicle, and/or any other network service information that the user may have subscribed to receive, may be transmitted by a server 302 and subsequently received by a navigation device 200 periodically. The periodic receipt of this information can be, for example, every three minutes. Information may be sent/received via modem 290 and transceiver 300 wherein packets of data are sent/received to the IP address of the modem 290. The modem 290 may be, for example, dual integrated for both GPS and GPRS. By establishing a constant connection between the navigation device 200 and the server 302, via the modem 290 for example, information can be transmitted from the navigation device 200, such as information relating to changes in position and speed of a vehicle, to the server 302 at a time the same as or different from receipt of the traffic or other information relating to potential delays.

Figure 6:
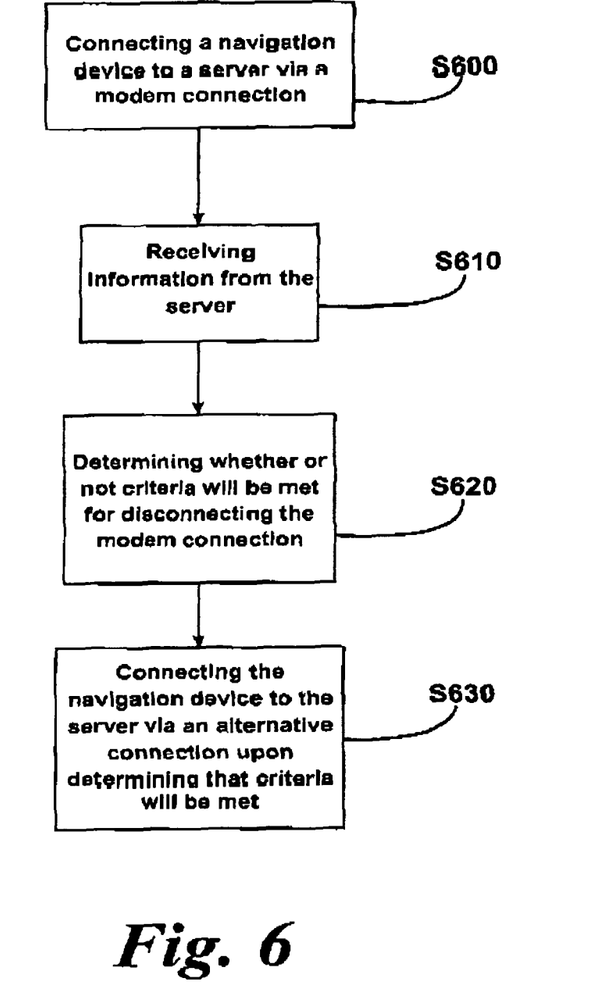
FIG. 6 is a flowchart illustrating an embodiment of the present application.

Further, not only can such information be sent/received via modem 290 of the navigation device, but in at least one embodiment, an alternative connection can be used. For example, FIG. 6 illustrates a method of an embodiment of the present application. In S600, the method of an embodiment of the present application includes connecting the navigation device 200 to a server 302 via a modem connection (using modem 290 for example, which may be within the navigation device 200, within an adapter of the navigation device 200, etc.). Thereafter, in S610, information (including but not limited to traffic or any other service subscription information that a user may have signed up to receive, LTO file information to enable a faster determination of location of the navigation device 200 upon powering the device on, map information, etc.) is received from the server 302.

During operation of the navigation device 200, the processor 210 determines, in S620, whether or not criteria will be met for disconnecting the modem connection. This determination can be made over periodic intervals, for example. For example, the processor 210 may monitor network signal strength information to determine if signal strength falls below a threshold level needed to maintain a good data connection via modem 290. Alternatively, the determining of whether or not criteria will be met, by the processor 210, may include using network coverage information included or embedded within map information of the navigation device 200.

Regarding network coverage information being included or embedded within map information of the navigation device 200, in one embodiment of the present application, Network Coverage and use type information may be stored as a Map Vendor Map Attribute for example. These attributes can be similar to current Navigation Map Attributes for example, and stored in memory 230, for example, as geographically related zone data, as part of a Map Data (Attribute) Database for example. This data can be Map Vendor Supplied (Tele Atlas, NAVTEQ, etc.), $3^{rd}$ party Supplied (POI, Map Data Vendors), or Manufacture Supplied (TomTom, Garmin, etc.).

As in Current Implementations, Map Vendor Supplied Data could be included in a release mechanism already in place, and can follow the quarterly release cycles currently followed by all major Navigation Quality Map Vendors. As is standard, this data may be augmented and adjusted for a specific navigation device, and/or manufacturer. Further, as in current implementations, $3^{rd}$ Party, and Manufacturer Supplied Data may be added, for example, after Map Vendors Publish the Quarterly Release Cycled Navigation Map Products. This data may first be accumulated, then collated, and transferred in Map attribute format, and combined with the Navigation Map Data, to form a complete Data set in the augment and adjust to specific device and/or manufacture stage.

In this implementation, both scenarios allow for quarterly updates, and for the user of the navigation device 200 to update their map data by using current methods of Over the Air updates, and/or updates when the device is docked to a home computer via the home dock, for example.

Thereafter, in S630, upon the processor 210 determining that criteria will be met for disconnection of the modem connection, the processor 210 can instruct connection of the navigation device 200 to the server 302 via an alternative connection, such as a Bluetooth connection via a mobile phone paired with the navigation device 200 for example.

In addition, in at least one embodiment, the method may further include at least one of downloading information to the navigation device 200 and uploading information to the server 302 over at least one of the modem 290 and the alternative connection, such as the Bluetooth connection for example. The information for at lest one of the uploading and downloading may include at least one of LTO information, traffic information, map information, etc. The processor 210 can then calculate the best modem choice along a route, and can plan a modem switch in advance, thus optimizing network data transfer, and/or end user cost/availability functions. In such an embodiment, the modem 290 can operate in cooperation with a transceiver 300 to transfer information between the navigation device 200 and a server 302 upon the processor 210 determining, for example, that network area coverage of the default modem 290, for example the internal modem 290, will permit data information transfer.

In S620 as explained above, the processor 210 determines whether or not criteria will be met for disconnecting the modem connection. In other words, the processor 210 determines, in advance, when the modem connection will fail and thus when it would be better to switch to an alternative, although less desirable alternative connection.

Within the navigation device 200, a route of travel of the vehicle can be determined by processor 210 for example, based upon at least a desired destination (such as one input by the user of the navigation device 200 for example) and a current location of the vehicle (such as that determined by a GPS/GPRS receiver within the navigation device 200 for example). Thereafter, subsequent to receipt of information relating to potential delays along the route of travel by the vehicle, a processor 210 within the navigation device 200 can determine a revised route of travel based upon the received information. This route information can further be used by processor 210 in determining whether or not criteria will be met for disconnecting the modem connection.

In at least one embodiment, the information transmitted may be used in normal operations of the navigation device 200, and/or further rules might be assessed to limit, or restrict certain activities between the server 302 and the navigation device 200. For example, when using the external modem (of the paired mobile device for example), a use might gain additional network coverage over the internal modem 290 of the navigation device 200, but the cost structures may be and/are likely higher for data transfer. As such, a user of the navigation device 200 may wish to not download, or transfer higher data elements such as map updates, or location history files, upon the switch occurring from the internal modem 290 to the external modem, of the paired mobile device for example. Further, the identity of the navigation device 200, and the intended vehicle usage and user type could also be used to determine the associated QOS settings, thus relating these activities to the quality/cost calculation, specifically [Data Access/Network data costs]. The QOS then, by category, could be used by processor 210 to determine mathematical activity sequence and availability.

In at least one embodiment, satellite location may be used to further determine the information transmitted and reduce network outages along the route of travel of the vehicle. The GPS chipset calculation may enable navigation device 200 to determine planned and/or expected network availability, and thus to plan downloads based upon expected modem switching between the internal modem 290 and the external modem (of the paired navigation device 200 for example). This may be a function of the addition of Navigation Map Attributes, for example, wherein a layer of the Navigation Map data may contain information regarding Geographic availability of Allowed Terrestrial Data Networks (in at least one embodiment, Specifically Mobile Network Operators).

The processor 210 can then calculate the best modem choice along a route, and can plan a modem switch in advance, thus optimizing network data transfer, and/or end user cost/availability functions. As one non-limiting example, this can be done using a simple rules based management system, the navigation device 200 can request LTO files (for example) from server 302, within the Network Coverage of the internal modem 290, for a duration that extends past the internal modem coverage area. This can then allow for costs/availability optimized variation in for example: LTO File Request Frequency, LTO File length, and LTO File Geo-Coverage. Further, if a navigation device 290 user is currently in The Netherlands, and enters a route to Spain, the navigation device 200 should request a short LTO for the Netherlands region, and dependant on Network Coverage parameters, (for example cost, proximity to network changes, etc.) the navigation device 200 can request a longer file for the Spain Region. The navigation device 200 can thus manage LTO files, reduce to minimum network data costs, and optimize TtFF (time to first fix) calculations, and can travel accurately based upon the received information.

In at least one embodiment, the information may be transmitted upon determining device type of the navigation device 200, such as a navigation device 200 for, for example, Commercial, Consumer (vehicle), Moto, and/or Pedestrian usage. Internal modem 290 coverage may extend to a known point. As part of a Map vendor navigation Map Attribute for example, a specific user of the navigation device 200 may wish to extend such functions past this point. For example, commercial users, and there owners, may wish to extend Track and Trace functionality across terrestrial data coverage areas. Further, if a user of the navigation device 200 is in multiple Network environment, there may be a QOS File setting that then sets usage standards for internal to external modem behavior based on use type category of the navigation device 200, and data obtained from navigation device 200 may then be used to determine the modem behavior and expected Track and Trace availability, with enhanced accuracy and predictive methods due to increased signal availability.

Further, in at least one embodiment, once the Network Interface Protocol [1022] connection between the navigation device 200 and the server 302 is established, as part of the Protocol the connection is identified with a modem 290 and network transfer type for example, navigation device 200 to modem data transfer activities may be adjusted to best suit the criteria of the connection type.

In at least one embodiment of the present application, the method of at least one embodiment expressed above may be implemented as a navigation device 200. In an embodiment of the present application, the navigation device 200 includes a modem 290 to connect the navigation device 200 to a server 302; a receiver 320 to receive information from the server 200; a processor 210 to determine whether or not criteria will be met for disconnecting the connection via the modem 290; and an alternative connection device to connect the navigation device 200 to the server 302, the alternative connection device being used upon the processor 200 determining that criteria will be met for disconnecting the connection of the modem 290. The modem 290 may be one within the navigation device 200 and/or within an adapter of the navigation device 200. The alternative connection device may include a Bluetooth connection device for connection to an external modem in a paired mobile device for example.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

As one of ordinary skill in the art will understand upon reading the disclosure, the electronic components of the navigation device 200 and/or the components of the server 302 can be embodied as computer hardware circuitry or as a computer readable program, or as a combination of both.

The system and method of embodiments of the present application include software operative on the processor to perform at least one of the methods according to the teachings of the present application. One of ordinary skill in the art will understand, upon reading and comprehending this disclosure, the manner in which a software program can be launched from a computer readable medium in a computer based system to execute the functions found in the software program. One of ordinary skill in the art will further understand the various programming languages which may be employed to create a software program designed to implement and perform at least one of the methods of the present application.

The programs can be structured in an object-orientation using an object-oriented language including but not limited to JAVA, Smalltalk, C++, etc., and the programs can be structured in a procedural-orientation using a procedural language including but not limited to COBOL, C, etc. The software components can communicate in any number of ways that are well known to those of ordinary skill in the art, including but not limited to by application of program interfaces (API), interprocess communication techniques, including but not limited to report procedure call (RPC), common object request broker architecture (CORBA), Component Object Model (COM), Distributed Component Object Model (DCOM), Distributed System Object Model (DSOM), and Remote Method Invocation (RMI). However, as will be appreciated by one of ordinary skill in the art upon reading the present application disclosure, the teachings of the present application are not limited to a particular programming language or environment.

The above systems, devices, and methods have been described by way of example and not by way of limitation with respect to improving accuracy, processor speed, and ease of user interaction, etc. with a navigation device 200.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A navigation device, comprising:
a modem for connecting a navigation device to a server;
a receiver for receiving information from the server;
a processor for determining whether or not criteria will be met for disconnection of the modem connection; and
an alternative connection device for connecting the navigation device to the server upon determining that criteria will be met for disconnection of the modem connection,
wherein the processor, in determining whether or not criteria will be met for disconnection of the modem connection, determines that at least one of
a network change is about to occur,
network coverage is about to fall below a threshold level, and
an end to network service of the modem of the navigation device is imminent.

2. The navigation device of claim 1, wherein the processor uses network coverage information included with map information of the navigation device to determine whether or not criteria will be met for disconnection of the modem connection.

3. The navigation device of claim 1, wherein the processor uses network signal strength information to determine whether or not criteria will be met for disconnection of the modem connection.

4. The navigation device of claim 3, wherein the connecting of the navigation device to the server via the alternative connection occurs upon the processor determining that the network signal strength of the modem connection is below a threshold level.

5. The navigation device of claim 1, further comprising:
a transceiver for at least one of downloading information to the navigation device and uploading information to the server over at least one of the modem and alternative connection.

6. The navigation device of claim 5, wherein the information for at least one of uploading and downloading includes at least one of LTO information, navigation device type or category, traffic information and map information.

7. The navigation device of claim 1, wherein the navigation device is connected to the server via at least one of GSM and CDMA.

8. The navigation device of claim 1, wherein the processor accesses default reference rules governing switching connection between the server and one of the modem of the navigation device and the alternative connection device.

9. The navigation device of claim 1, wherein the alternative connection device a modem external to the navigation device, for connecting the navigation device to the server upon the modem connection being disconnected.

10. The navigation device of claim 9, wherein the alternative connection device includes a Bluetooth connection for connecting the navigation device to a modem of a device external to the navigation device.

11. The navigation device of claim 9, further comprising:
a transceiver for transferring data information between the navigation device and the server upon the processor determining that network area coverage of the modem of the device external to the navigation device permits data information transfer.

12. The navigation device of claim 11, wherein data information is initially transferred between the navigation device and the server via the modem of the navigation device and data information transfer is switched to the alternative connection upon the processor at least one of determining that the modem of the navigation device does not provide network area coverage and determining that a network change is about to occur.

13. The navigation device of claim 12, wherein the processor at least one of limits and restricts data information transfer between the server and the navigation device.

14. The navigation device of claim 12, wherein the at least one of limiting and restricting of data information transfer includes at least one of limiting and restricting transfer of at least one of map update information and location history files during the alternative connection.

15. The navigation device of claim 11, wherein the information transmitted from the navigation device is useable to determine a category type of the navigation device.

16. The navigation device of claim 15, wherein the category type of the navigation device includes at least one for commercial usage, consumer usage, motorcycle usage, and pedestrian usage.

17. The navigation device of claim 15, wherein data transfer activities are adjusted by the processor based upon the category type of the navigation device.

18. The navigation device of claim 1, wherein the modem connection is shut down, upon the processor determining that criteria will be met for disconnection of the modem connection, through a shut down sequence of the modem of the navigation device, the connecting of the navigation device to the server via the alternative connection being thereafter initiated via a modem external to the navigation device by the alternative connection device.

19. The navigation device of claim 1, wherein the processor, in determining whether or not criteria will be met for disconnection of the modem connection, uses satellite location of the navigation device to reduce network outages along a route of travel of a vehicle in which the navigation device is located.

20. The navigation device of claim 1, wherein the processor, in determining whether or not criteria will be met for disconnection of the modem connection, calculates a modem selection along the route, and plans a modem connection switch in advance of the modem disconnection and alternative connection.

* * * * *